Figure 7:
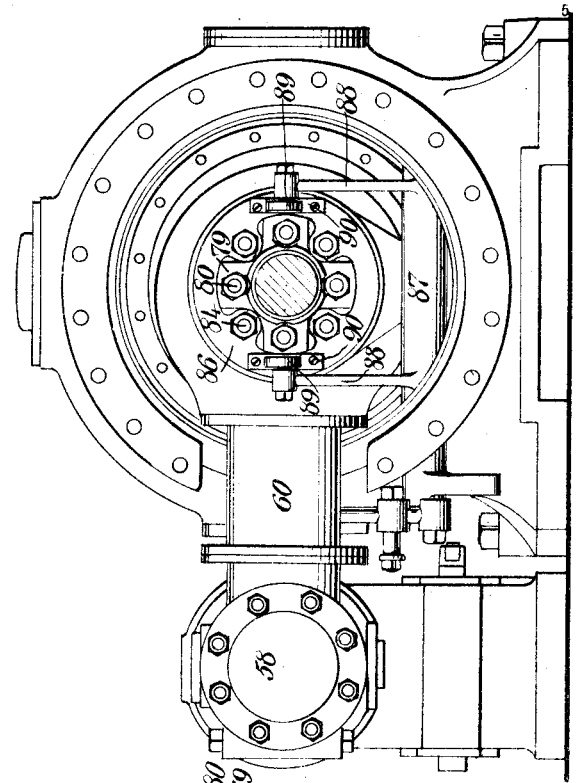

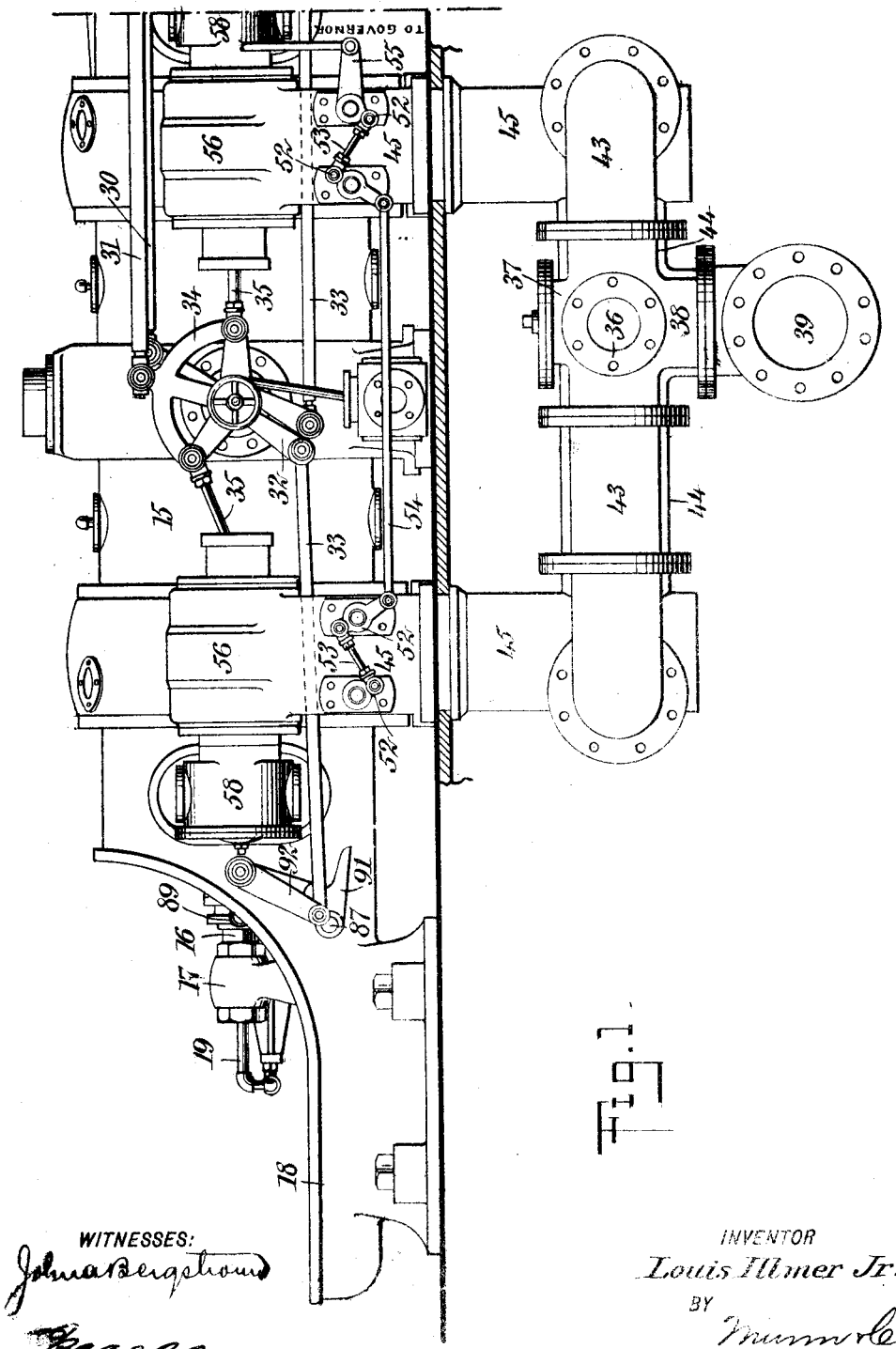

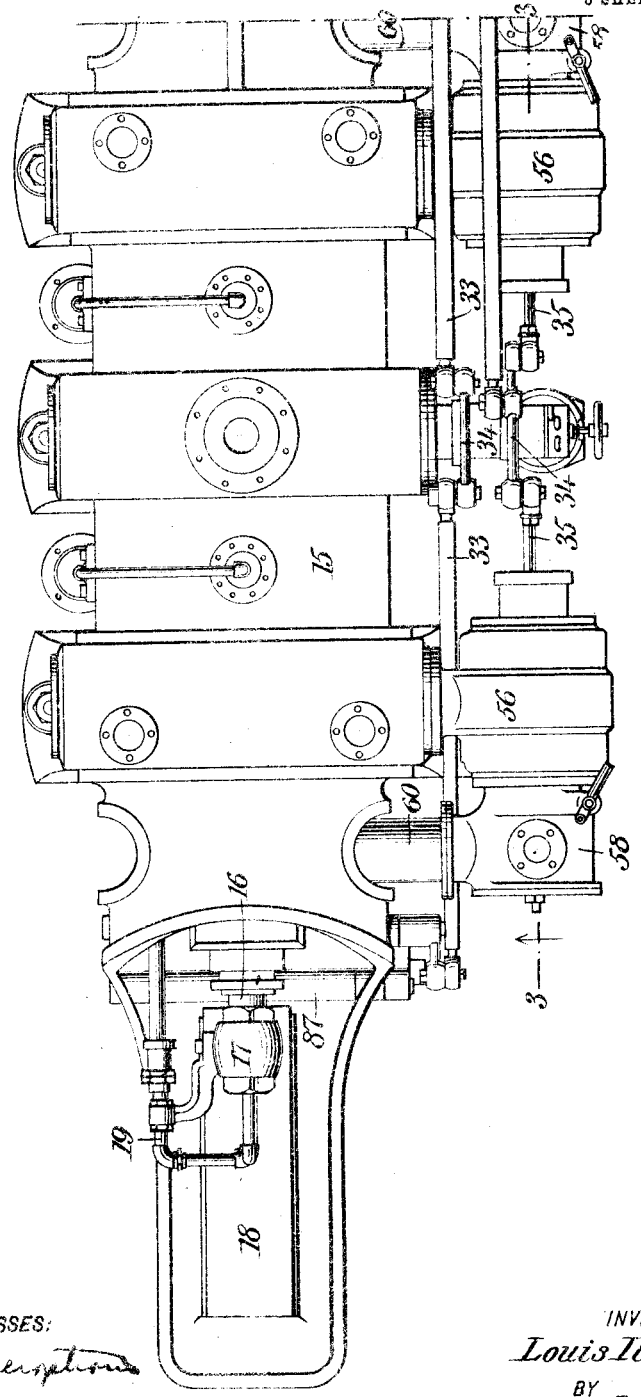

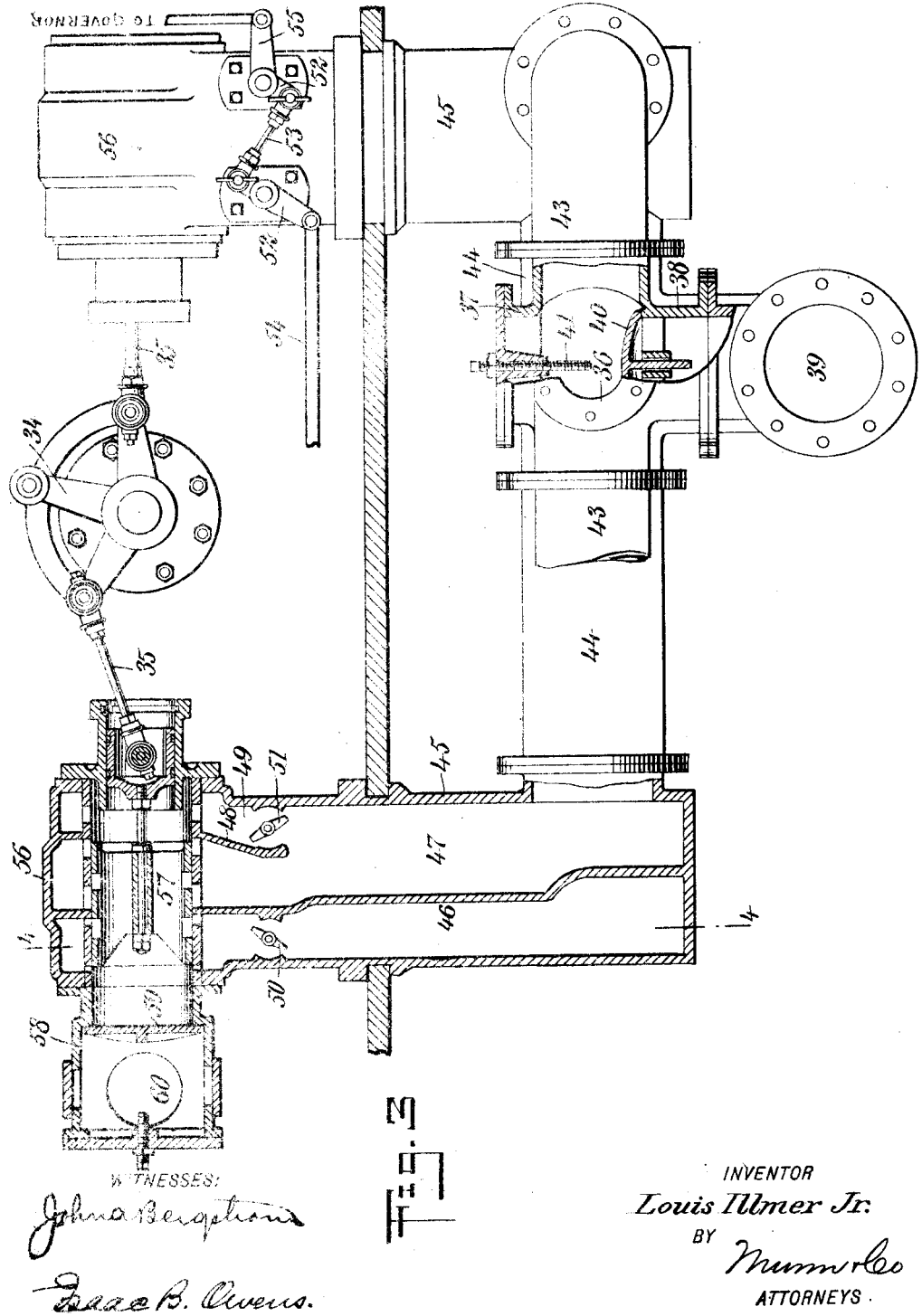

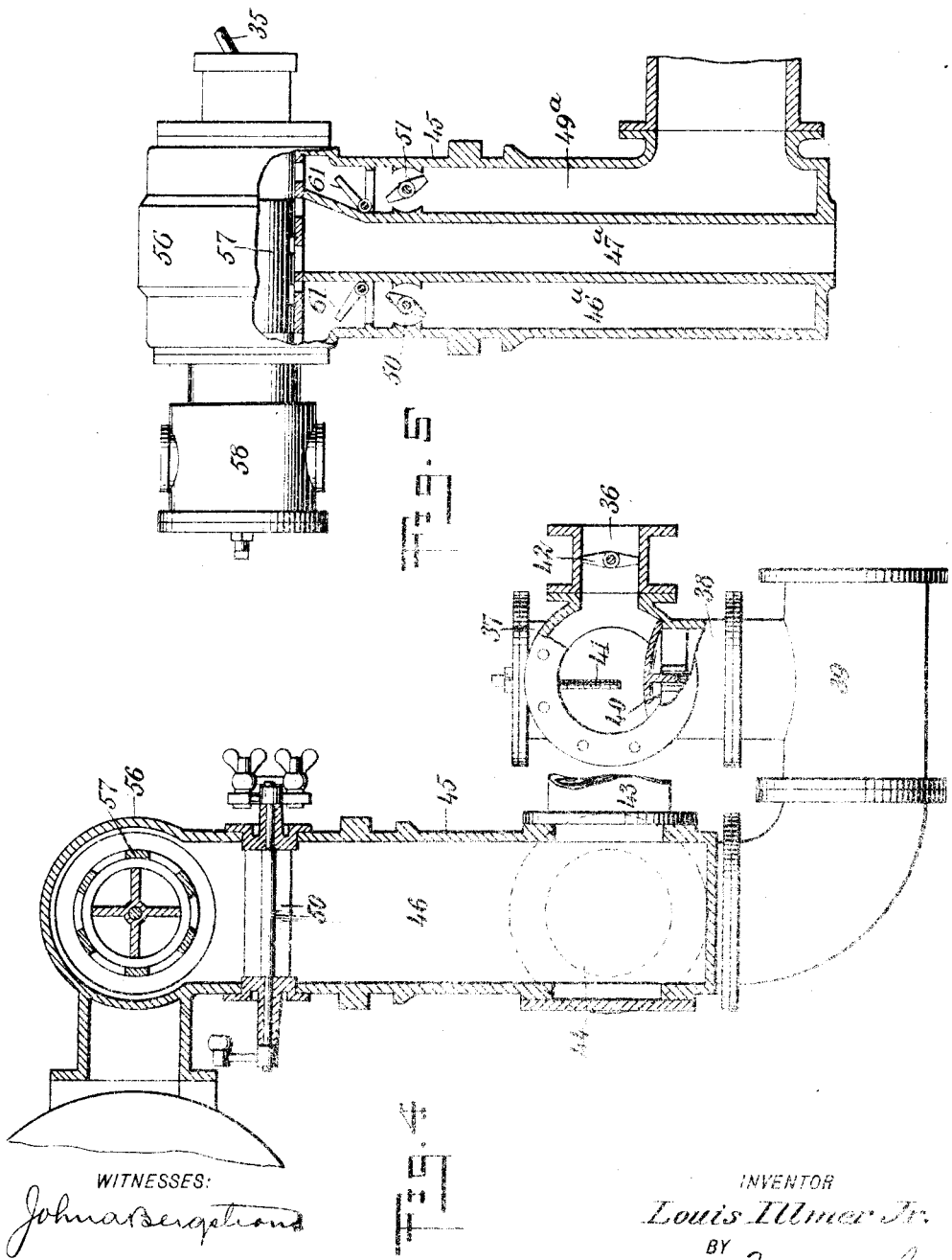

L. ILLMER, Jr.
INTERNAL COMBUSTION ENGINE.
APPLICATION FILED JAN. 23, 1906.

1,057,837.

Patented Apr. 1, 1913.

5 SHEETS—SHEET 5.

WITNESSES:
Joshua Bergstrom
Isaac B. Owens.

INVENTOR
Louis Illmer Jr.
BY
Munn & Co
ATTORNEYS

UNITED STATES PATENT OFFICE.

LOUIS ILLMER, JR., OF ITHACA, NEW YORK, ASSIGNOR, BY DIRECT AND MESNE ASSIGNMENTS, TO ILLMER GAS ENGINE COMPANY, A CORPORATION OF DELAWARE.

INTERNAL-COMBUSTION ENGINE.

1,057,837. Specification of Letters Patent. Patented Apr. 1, 1913.

Application filed January 23, 1906. Serial No. 297,405.

*To all whom it may concern:*

Be it known that I, LOUIS ILLMER, Jr., a citizen of the United States, and a resident of Ithaca, in the county of Tompkins and State of New York, have invented a new and Improved Internal-Combustion Engine, of which the following is a full, clear, and exact description.

My invention relates particularly to two cycle scavenging engines using gaseous fuel, and its object is to secure an increase in capacity for the given cylinder dimensions. I attain this end by forcing a portion of the mixture charge into the power cylinder after the exhaust closure so that at the time of the inlet closure the working charge attains an initial pressure considerably above that of the atmosphere. The mixture charge is thereupon further compressed, ignited and expanded. This increase of the initial pressure results in an increase of the volumetric capacity of the power cylinder, which, in turn, causes an increase in the mean effective pressure of expansion and admits of a large power capacity for given cylinder dimensions. In order to overcome the effects of the extra heating of the cylinder parts when working with the resulting heavy explosive charges, I provide means for scavenging the cylinder thoroughly, so as to avoid, in part, the increased liability to preignition and back firing involved. For the purpose of avoiding excessively high explosion pressures, I prefer to work with a fairly large compression space so as to secure a relatively large mean effective pressure in the power cylinder with respect to a predetermined limit of explosive pressure.

My improvements are especially adapted for use in connection with blowing engine plants for supplying blast furnaces, particularly when the blast furnace gas is used as fuel in the engine. In these plants it is customary to supply a blast usually ranging from 15 to 25 pounds per square inch and since this pressure is well suited for use with the present invention, I propose in such plants to employ the needed compressed air directly from the blowing engine mains, thus avoiding the necessity of a special pump for this purpose.

My invention also involves certain improvements in the means for controlling and admitting air and gas as a mixture body, and air as a body of scavenging blast to the power cylinder, the arrangement being such that the entire portion of the mixture body is pressed completely past the inlet valve and into the power cylinder, by means of a body of air at a relatively high pressure. In this manner I impart to the working charge, its relatively high initial pressure, previous to the inlet closure, and, at the same time, supply the conduit leading to the inlet valve with a body of air, which is subsequently employed to scavenge the power cylinder. The said improved devices for controlling the air and gas also involve a peculiar method of regulation, according to which the air and gas mixing valve is given a constant stroke, and the governing is effected by throttling the air and gas supply to said mixing valve, this throttling being preferably accomplished by means of valves arranged in the air and gas conduits and having direct connection with the governor so as to operate said valves simultaneously, the valves not changing their relative positions.

Reference is to be had to the accompanying drawings which illustrate, as an example of my invention, a double acting two cycle engine, using a gaseous fuel, in which:—

Figure 5:
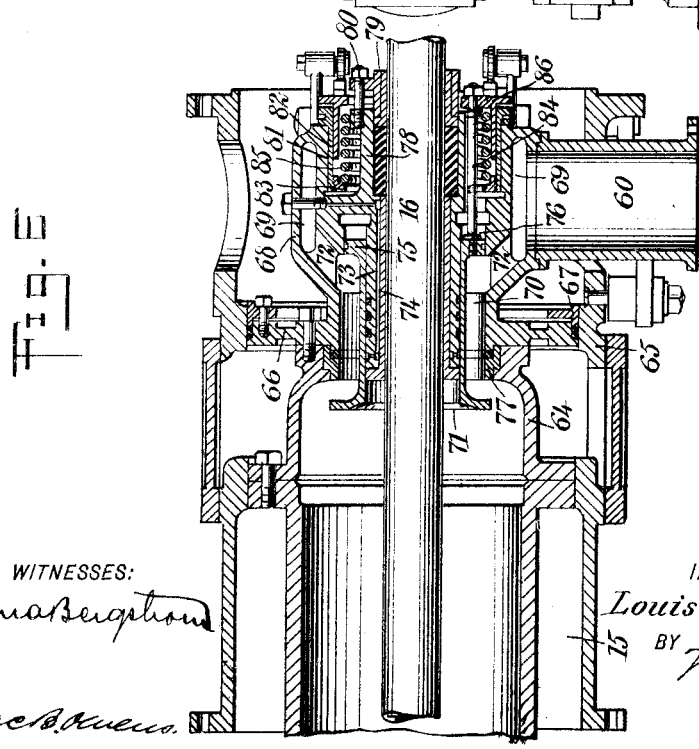

Figure 1 represents a side elevation of the engine. Fig. 2 represents a plan view of the same. Fig. 3 is an elevational view with parts in section, irregularly following the line 3—3 of Fig. 2, said figure showing the air and gas supply ducts, the governing throttle valves and their gear and one of the mixing valves and its gear. Fig. 4 is a sectional view on line 4—4 of Fig. 3. Fig. 5 is a sectional elevation showing a modification in the arrangement of ducts for air and gas, in which modified arrangement three distinct ducts are provided, one for the gas, one for the air which is at the same pressure as the gas and intended for admixture therewith, and a third for the scavenging air which is at a relatively higher pressure, as will appear hereinafter. Fig. 6 is a horizontal section showing the admission or inlet valve and its mounting means. Fig. 7 is an end elevation of the parts shown in Fig. 6, this view also illustrating the position of the air and gas supply conduits and the mixing valves.

The type of engine here illustrated is a double acting two cycle engine, and in the drawing 15 indicates the cylinder which has an inlet valve at each end and exhaust ports at the middle, all of which will be understood from the prior art.

As shown best in Figs. 3 and 4 the gas supply 36 leads to a casing 37. 40 indicates a check valve which opens from the branch 38 into the casing 37, the degree of opening of which may be controlled by a stop screw 41 operating in the top of the casing 37 and for the purposes of this invention, the valve 40 may be permanently held on its seat by the screw 41. From opposite sides of the casing 37 branch conduits 43 pass, and the air conduit or main 39 is turned upward and provided with oppositely extending branches 44, best shown in Fig. 3. The branches 43 and 44 pass respectively to the air and gas conduits 45, one of which is shown in section in Fig. 3 from which it will be seen that said conduits are divided into two passages 46 and 47, the gas branches 43 passing to the conduits 46 and the air branches passing to the air conduits 47. The air passage 47 is provided at its upper or discharge end with an internal wall 48 which provides a branch passage 49, and located in said passage 49 and in the gas passage 46 are throttle valves 50 and 51, said valves having their stems as best shown in Fig. 1, projected outside of the conduits 45 and provided with arms 52 joined by links 53. Both pairs of valves at each end of the cylinder are connected to move in unison, by a rod 54 which extends longitudinally alongside of the cylinder, and 55 indicates a connection to the governor of the engine so that the throttle valves 50 and 51 are operated directly from the governor. These valves do not change their relative positions, each valve opening or closing to the same degree, and there being no movement of the valves except upon a change in the load on the engine. The air passage 47 as shown in Fig. 3 is adapted to carry the air both for mixing with the gas and for forming the scavenging blast, the branch 49 conducting the air for mixture with the gas, while the scavenging air passes through the main part of the passage.

It is preferred to operate the engine on the principle of pre-compression of the charge, outlined heretofore, and in this case the air would be admitted to the passages 47 under the relatively high pressure referred to, and the valves 51 would be adjusted to throttle or control the air passing the branch 49 so that said air will have a pressure only equal to that of the gas from the passage 46, while the higher pressure scavenging air will pass without interference from the main part of the passage. It will therefore be seen that, in case of the construction shown in Fig. 3 the throttle valves 51 perform two functions, i. e. reducing or controlling the pressure of the air which is admitted into the mixing valves to form the explosive mixture, and operating synchronously with the valves 50 to regulate the volume of the explosive mixture.

Each conduit 45 leads to a mixing valve casing 56; one of these casings is shown in Fig. 3, and operating in each casing is a mixing valve 57 to which the radial rods 35 are joined and are operated by the wrist plates 34 in unison with the piston movements.

The passages 46 and 47 and the branch passage 49 communicate by suitable ports with the interior of the corresponding casing 56; and the valve 57 is so ported and operated that it will move to one position simultaneously uncovering the gas passage 46 and the air branch passage 49 so that the air and gas flow through the valve and are mixed to form a body of the explosive mixture which passes out toward the cylinder, after which the mixing valve is moved to cut off the gas and the air supply from the branch 49 and to open the passage 47 where the scavenging air, at the relatively high pressure heretofore described, passes to the mixing valve behind the body of explosive mixture and forces the entire body of explosive mixture past the inlet valve and into the power cylinder while the scavenging air lies in the conduit leading to the inlet valve during the entire period of inlet closure, and this scavenging air being followed by a second charge or body of explosive mixture, formed the same as the first charge just referred to.

As best shown in Fig. 2 the mixing valve casings 56 discharge into check valve casings 58, one of which is shown in section in Fig. 3, said casing carrying automatic check valves 59 which prevent back flow into the mixing valves, and in turn communicate with the conduits 60 leading into the inlet valve housings (see Figs. 2, 6 and 7).

The purpose of the check valve 59 is simply to prevent the high pressure air stored in the conduit 60 from dropping back into the gas passage 46.

Instead of employing the two passages 46 and 47 with the branch 49 above described, I may employ in the ducts 45 a three-passage system as illustrated in Fig. 5. In said view 46$^a$ indicates the gas passage, with which the gas supply communicates in any desired manner; 47$^a$ indicates the scavenging air passage to which the air is preferably introduced at a pressure of about fifteen to twenty pounds, as explained, and 49$^a$ indicates a mixture air passage, which air is admitted at a pressure approximately equal to that of the gas. The passages 46$^a$ and 49$^a$ are provided with throttle valves 50 and 51, the same as the construction shown in Fig. 3, and said passages are also provided with automatic check valves 61 which seat to prevent the return of pressure from the mixing valves into the passages, answering the same purpose as check valve 59 in Fig. 3. With this arrangement the mixing valve 57 operating in the casing 56 as before, serves first to uncover the passages 46ᵃ and 49ᵃ, admitting the air and gas to flow through the mixing valve and forming a body of explosive charge which flows on toward the cylinder. Upon the next movement of the mixing valve, the scavenging air, at a relative high pressure referred to, passes the mixing valve behind the body of working charge and forces the entire charge past the inlet valve, as explained. The mixing valve may, if desired, be arranged completely to close the passages 46ᵃ and 49ᵃ, while the scavenging air is flowing from the passage 47ᵃ, but this is not essential since the check valves 61 will close under the high pressure of the scavenging air, stopping the flow of gas, and the low pressure air through the passages 46ᵃ and 49ᵃ, during the time that the scavenging air at a high pressure is flowing through the mixing valves. The throttle valves 50 and 51 as shown in Fig. 5, are connected with the governor and operate precisely as in Fig. 3, excepting that the valve 51 does not need to be set to throttle the pressure flowing past it, owing to the fact that two separate passages, i. e. 47ᵃ and 49ᵃ, are provided to carry the scavenging air.

In the operation of the engine, assuming the construction shown in Fig. 3 is employed, the mixing valve 57 will move under the action of its operating mechanism to cover the main part of the passage 47 and admit gas from the passage 46 and air from the branch 49 forming a body of explosive mixture of air and gaseous fuel which passes through the duct 60 into the housing 68. At or before this time, the inlet valve 71 will be opened by the mechanism provided for the purpose, and a portion of the mixture body will have passed into the cylinder. As soon as the pre-arranged volume of explosive mixture is formed by the valve 57, said valve operates to cut off the gas supply and admit the high pressure scavenging air from the main part of the passage 47; at the same time the exhaust port will have closed. This scavenging air passes through the duct 60 into the housing 68 and forces all of the remaining portion of the mixture body past the inlet valve 71 into the cylinder and against the compression pressure created by the piston movement. After this takes place the inlet valve closes, the piston continues its compression stroke, then the spark is passed and the expansion stroke follows. At the end of the expansion stroke the exhaust ports are uncovered and the inlet valve 71 again opens, first admitting the body of scavenging air lying back of it, so as to scavenge the cylinder of the burnt gases, after which the mixture body follows and the above described operations are repeated in the order given.

The operation is the same in all essential particulars when the structure shown in Fig. 5 is employed.

Having thus fully described my invention, I claim:—

1. In an explosive engine of the compression type, the combination of a power cylinder having an inlet and an exhaust port, a piston, a supply of gaseous fuel, a supply of air at two pressures, one approximately equal to that of the gas and the other materially higher, means communicating with the inlet port to measure, and let forward, alternately into the power cylinder, first a body of scavenging air to cleanse the same, said means opening the gas supply and the low pressure air supply to form a mixture body of air and gaseous fuel and allowing such mixture body to follow the scavenging air body, said means subsequently closing the gas supply and opening the high pressure air supply to force the entire mixture body into the power cylinder during the early part of the piston compression period.

2. In an explosive engine of the compression type, the combination of a power cylinder having an inlet and an exhaust port, a piston, a supply of gaseous fuel, a supply of air at a pressure materially higher than that of the gas supply, means communicating with the inlet port to measure, and let forward alternately into the power cylinder, first a body of scavenging air, then a supply of gas and throttled air to form a mixture body of air and gaseous fuel and allowing a portion of such mixture body to follow the scavenging air body, said means subsequently closing the gas supply and opening fully the air supply to force the entire mixture body into the cylinder during the early part of the piston compression period.

3. In an explosive engine of the compression type, the combination of a power cylinder having an inlet and an exhaust port, a piston adapted to compress the explosive mixture before its ignition period, a supply of gaseous fuel, a supply of air at a pressure materially higher than that of the gas supply, a conduit means discharging to the inlet port, means at the receiving end of said conduit to measure, and let forward alternately through said conduit and into the cylinder, first a body of scavenging air, then a supply of gas and a supply of air at relatively low pressure to form a mixture body of air and gaseous fuel, and allowing a portion of such mixture body to follow the scavenging air body into the cylinder, then a supply of air under relatively high pressure to force the entire mixture body into the cylinder during the early part of the piston compression period.

4. In an explosive engine the combination of a power cylinder having an inlet and an exhaust port, a piston, a supply of gaseous fuel, a supply of air at a pressure materially higher than that of the gas supply, means communicating with the inlet port to measure, and let forward alternately into the cylinder, first a body of scavenging air, said means opening the gas supply and throttling the air supply to form a mixture body of air and gaseous fuel, and allowing a portion of such mixture body to follow the scavenging air body into the cylinder, said means subsequently closing the gas supply and opening fully the air supply to force the remaining portion of said mixture body into the cylinder during the early part of the piston compression period, and a governor controlled means for regulating the volume of mixture body in accordance with the load of the engine.

5. In an explosive engine the combination of a power cylinder having an inlet and an exhaust port, a piston adapted to compress the explosive mixture body before its ignition period, a supply of gaseous fuel, a supply of air at a pressure materially higher than that of the gas supply, a conduit means discharging to the inlet port, means at the receiving end of said conduit to measure, and let forward alternately through said conduit and into the power cylinder, first a body of scavenging air, said means then opening the gas supply and throttling the air supply to form a mixture body of air and gaseous fuel and allowing such mixture body to follow the scavenging body into the conduit means, said means subsequently closing the gas supply and opening fully the air supply to force said mixture body into the cylinder during the early part of the piston compression period, and means for maintaining a body of air in said conduit means during the whole period of inlet closure, which body of air constitutes the scavenging air body for the succeeding mixture body.

6. In an explosive engine of the compression type, the combination of a power cylinder having an inlet and an exhaust port, a piston, a supply of gaseous fuel, a supply of air at a pressure materially higher than that of the gas, means communicating with the inlet port to measure, and let forward alternately into the cylinder, first a body of scavenging air, said means then throttling the air supply and opening the gas supply to form, at a low pressure, a mixture body of air and gaseous fuel and allowing a quantity, sufficient to fill the cylinder, of such mixture body to follow the scavenging air into the cylinder, said means subsequently opening fully the air supply to force the entire mixture body into the cylinder during the early part of the piston compression period.

7. In an explosive engine of the two cycle type, the combination of a power cylinder having an inlet and an exhaust port, a piston, means to which a gas supply and an air supply lead, said means being adapted to measure, and let forward alternately into the cylinder, first a body of scavenging air, then a mixture body of air and gaseous fuel and, after the exhaust port is closed, a body of air under relatively high pressure to force the entire mixture body into the cylinder.

In testimony whereof I have signed my name to this specification in the presence of two subscribing witnesses.

LOUIS ILLMER, Jr.

Witnesses:
EDW. J. MONE,
SQUIRE B. ROLFE.